US009371038B2

(12) United States Patent
Gregory, Jr.

(10) Patent No.: US 9,371,038 B2
(45) Date of Patent: Jun. 21, 2016

(54) REMOVABLE PAYLOAD CONTAINMENT SYSTEMS FOR PLATFORMS, INSTALLATION METHODS THEREOF, AND PAYLOAD INTEGRATION KITS FOR EXISTING PLATFORMS

(71) Applicant: U.S. Army Research Laboratory, Washington, DC (US)

(72) Inventor: Richard R. Gregory, Jr., Mount Airy, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 275 days.

(21) Appl. No.: 13/905,215

(22) Filed: May 30, 2013

(65) Prior Publication Data
US 2014/0042199 A1 Feb. 13, 2014

Related U.S. Application Data

(60) Provisional application No. 61/680,552, filed on Aug. 7, 2012.

(51) Int. Cl.
*B60R 7/00* (2006.01)
*B60R 7/02* (2006.01)

(52) U.S. Cl.
CPC .............. *B60R 7/02* (2013.01); *Y10T 29/49826* (2015.01); *Y10T 29/53* (2015.01)

(58) Field of Classification Search
CPC .......................................................... B60R 7/02
USPC ..................................... 224/401; 29/428, 700
See application file for complete search history.

(56) References Cited

U.S. PATENT DOCUMENTS

| 4,195,757 A | * | 4/1980 | Jefferson | ............... A45C 11/20 206/541 |
| 4,606,104 A | * | 8/1986 | Stiller | ......................... 29/890.14 |
| 4,737,055 A | * | 4/1988 | Scully | ....................... B60P 7/13 114/75 |
| 4,771,971 A | * | 9/1988 | Ludwig | ................. B64G 1/641 165/104.33 |

(Continued)

OTHER PUBLICATIONS

Photographs of U.S. Army Research Laboratory (ARL) payload container design, May 2009.

(Continued)

*Primary Examiner* — Justin Larson
*Assistant Examiner* — Lester L Vanterpool
(74) *Attorney, Agent, or Firm* — Eric Brett Compton

(57) ABSTRACT

Embodiments of the invention are directed to removable payload containment systems for platforms, installation methods thereof and payload integration kits for platforms. The removable payload containment system may include: a housing having internal space for components, the housing including at least one connector configured to couple with at least one corresponding connector of the platform when the system is installed in or on the platform; and a latch mechanism that couples to a member of the platform and is configured to maintain the system into substantially non-moving engagement with the platform when engaged therewith, and permit removal of the system from the platform when released. The latch mechanism may be configured to limit movement of the housing with respect to platform in substantially only one direction when one connector couples and uncouples, and is mated, with a corresponding connector of the platform when installing or removing the system from the platform.

27 Claims, 12 Drawing Sheets

(56) References Cited

U.S. PATENT DOCUMENTS

| | | | | |
|---|---|---|---|---|
| 5,215,234 A | * | 6/1993 | Pasley | B60R 9/06 224/508 |
| 2005/0092799 A1 | * | 5/2005 | Morris | B60R 9/06 224/484 |
| 2006/0261111 A1 | * | 11/2006 | McCoy | B60R 9/065 224/499 |

OTHER PUBLICATIONS

"My First VCR" CY's Eye of Life, Blog Archive, Jun. 3rd, 2007. Available at: http://blog.cyborg5.com/?p=87 (accessed Oct. 26, 2012).

iRobot SUGV® Accessories 2012 (brochure). © 2012 iRobot Corporation. Available at: http://www.irobot.com/~/media/Files/Robots/Defense/SUGV/iRobot-SUGV-Accessories.ashx.

iRobot PackBot® Accessories 2012 (brochure). © 2008-2012 iRobot Corporation. Available at: http://www.irobot.com/~/media/Files/Robots/Defense/PackBot/iRobot-510-PackBot-Accessories.ashx.

"All-Terrain Intelligent Robot Braves Battlefront to Save Lives," NASA Office of Chief Technologist website. Available at: http://spinoff.nasa.gov/Spinoff2005/ps_1.html (Page Last Updated: May 1, 2011).

Photograph of iRobot PackBot configured with antenna array. Available at: http://www.defensereview.com/1_31_2004/iRobotPackBot_3.jpg (last modified May 19, 2009).

iRobot Third-Party Development (brochure). © 2008-2010 iRobot Corporation. Available at: http://www.irobot.com/us/Support/~/~/media/9C9D36A25FA34FD08B66A3A2C12143C6.ashx.

3D Dead-reckoning System. Available at: http://mrl.engin.umich.edu/PE_3D_a.html (accessed Sep. 24, 2012).

* cited by examiner

COMPONENTS

EMI-RFI SHIELDING & INTERNAL DETAILS

INSTALLATION - STEP 1

INSTALLATION - STEP 2

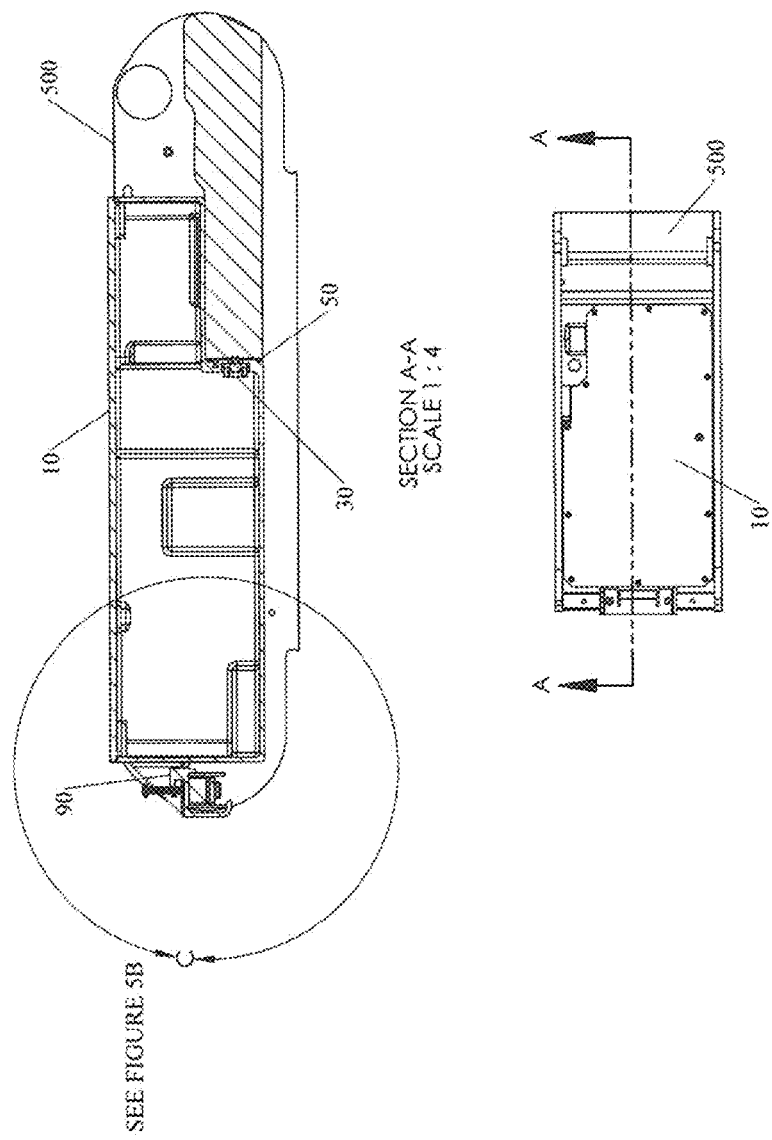

CONNECTION & SEAL DETAILS

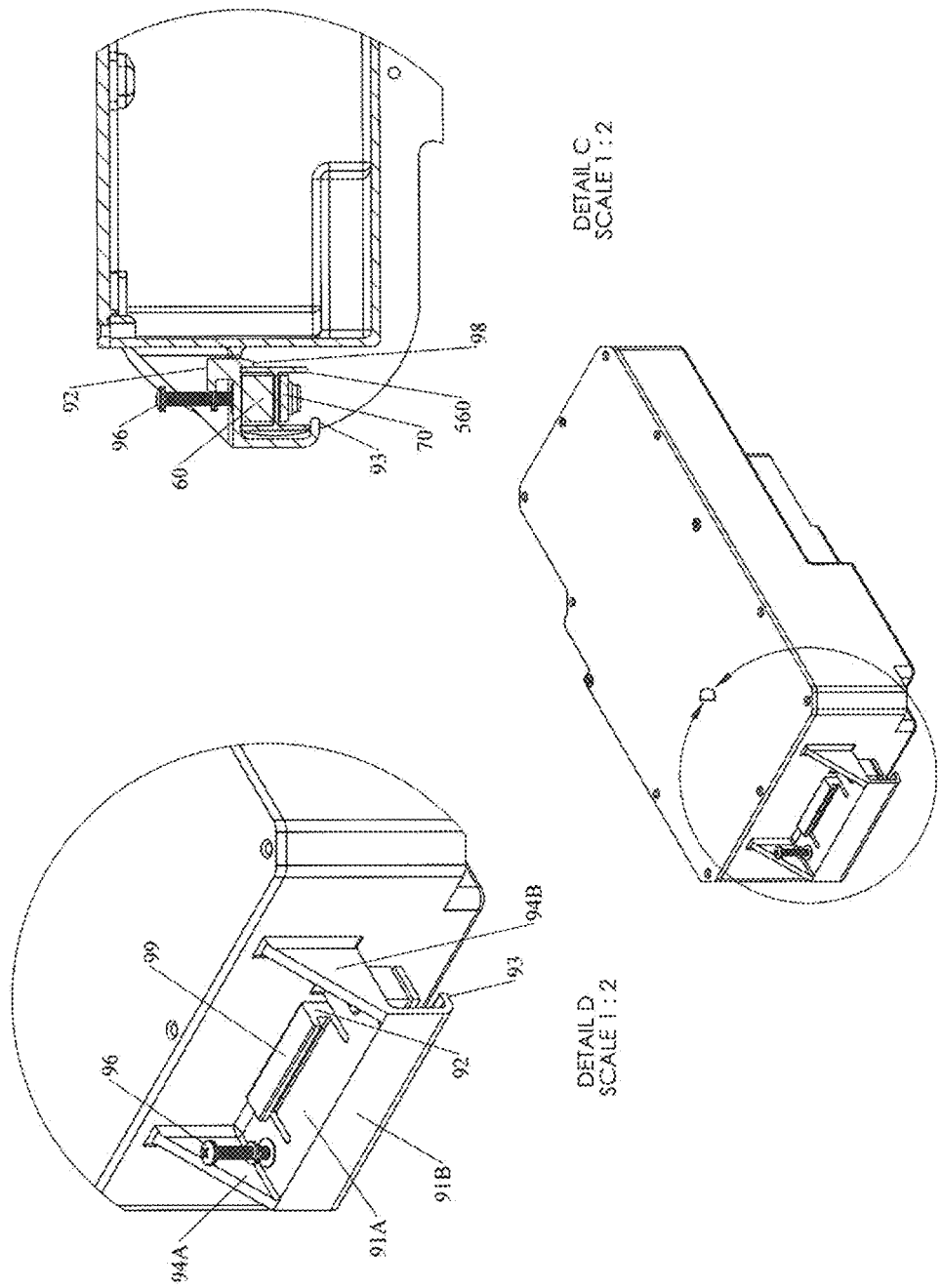

TOP VIEW

MODULAR SYSTEM EMBODIMENT

REMOVABLE PAYLOAD CONTAINMENT SYSTEMS FOR PLATFORMS, INSTALLATION METHODS THEREOF, AND PAYLOAD INTEGRATION KITS FOR EXISTING PLATFORMS

CROSS REFERENCE TO RELATED APPLICATION(S)

The present application claims the benefit of U.S. Provisional Patent Application No. 61/680,522 filed Aug. 7, 2012, herein incorporated by reference in its entirety herein.

GOVERNMENT INTEREST

The invention described herein may be manufactured, used and licensed by or for the U.S. Government without the payment of royalties thereon.

BACKGROUND OF THE INVENTION

1. Field

Embodiments of the present invention generally relate to payload containment systems, and in particular, to removable payload containment systems for various platforms.

2. Description of Related Art

The U.S. Army is developing various intelligent, autonomous robotic systems. Example robots include, for instance, Small Unmanned Ground Vehicle (SUGV) Model Nos. 310 and 320 available from iRobot Corporation of Somerville, Mass. The robots may be configured for various missions, which may require markedly different hardware and component configurations. For example, one or more sensors, detectors, measuring devices, appendages, armaments, etc. may be mounted onto a robot for a particular mission. Components typically are mounted directly to the robot's chassis through the various electro-mechanical couplings and connected to pin connectors on the robot's chassis through a plug or flexible ribbon or cable connection for providing power or signal communications. Configuring the robot for a particular mission can be quite a lengthy process—not to mention a challenge to mount various and different hardware components and related electronics to the robotic platform.

The U.S. Army Research Laboratory (ARL) has designed and built a payload container for iRobot Corporation's previous robotic platform, the PackBot®, which includes an opening for enabling coupling of a connector inside the housing to a mating pin connector mounted to the robot's chassis. The payload container can be fastened directly to the robot's chassis with screw fasteners. Fastening and removing the payload container to the robot requires significant time to install or remove the screw fasteners, and the payload container is not water-proof, dust-proof, or shielded to adequately protect sensitive electronic components therein. Furthermore, and also of particular concern, is that when a connector is being connected to and disconnected from a corresponding connector of the robot and even during use, the fragile connectors are susceptible to damage. For instance, even slight rotation or pivoting of the payload container with respect to the robot's chassis (or movement in a direction other than required to couple/uncouple the connectors) can shear, break, crush, bend, and/or otherwise damage the pin connections or contacts of the connector, crack or break the wall of connector and/or the payload container, or unintentionally disconnect the connector, among other problems. In light of these issues, this payload container has proved quite limited for in-field use, and impractical for many applications.

An improved payload container system for platforms would be beneficial.

BRIEF SUMMARY OF THE INVENTION

Embodiments of present invention are directed to removable payload containment systems for platforms, installation methods thereof, and payload integration kits for existing platforms.

According to one embodiment, a removable payload containment system for installation in or on a platform may include: a housing having internal space for one or more components, the housing including at least one connector configured to couple with at least one corresponding connector of the platform when the system is installed in or on the platform; and a latch mechanism that couples to a member of the platform and is configured to maintain the system into substantially non-moving engagement with the platform when engaged therewith, and permit removal of the system from the platform when released. The latch mechanism may be further configured to limit movement of the housing with respect to platform in substantially only one direction when one connector couples and uncouples, and is mated, with a corresponding connector of the platform when installing or removing the system from the platform.

According to another embodiment, a method of installing or removing a removable payload containment system in or on a platform may include: moving the payload containment system in one direction when the at least one connector couples and uncouples with the corresponding at least one connector of the platform, wherein the latch mechanism limits motion to substantially only the one said direction. The method may further include: moving the payload containment system in a second direction to place the system adjacent to or remove the system away from the platform.

According to yet another embodiment, a payload integration kit for an existing platform may include: a removable payload containment system; and one or more components to adapt the existing platform for use with the payload containment system.

According to a further embodiment, a modular payload containment system for a platform may include: a plurality of payload containment systems, wherein the systems are configured to be installed in or on the same platform with at least two systems having different component configurations. The modular system may include at least two systems have housings that differ in at least one of the height, length, and width dimensions, and/or shape.

According to an additional embodiment, a combination may include: a removable payload containment system; and the platform.

Other features of one or more embodiments of this disclosure will seem apparent from the following detailed description, accompanying drawings, and the appended claims.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. The drawings are not to scale unless so stated. It is to be noted, however, that the appended drawings illustrate only typical embodiments of this invention and are therefore not to be considered limiting of its scope, for the invention may admit to other equally effective embodiments. These embodiments are intended to be included within the following description and protected by the accompanying claims.

FIG. 1 shows payload containment system according to an embodiment.

FIG. 3 shows Step 1 of the payload containment system installation onto the SUGV robotic platform. FIG. 4 shows Step 2 of the payload containment system installation onto the SUGV robotic platform.

FIGS. 5, 5A and 5B show the payload containment system, latch mechanism and connector interface in greater detail.

Figure 1:
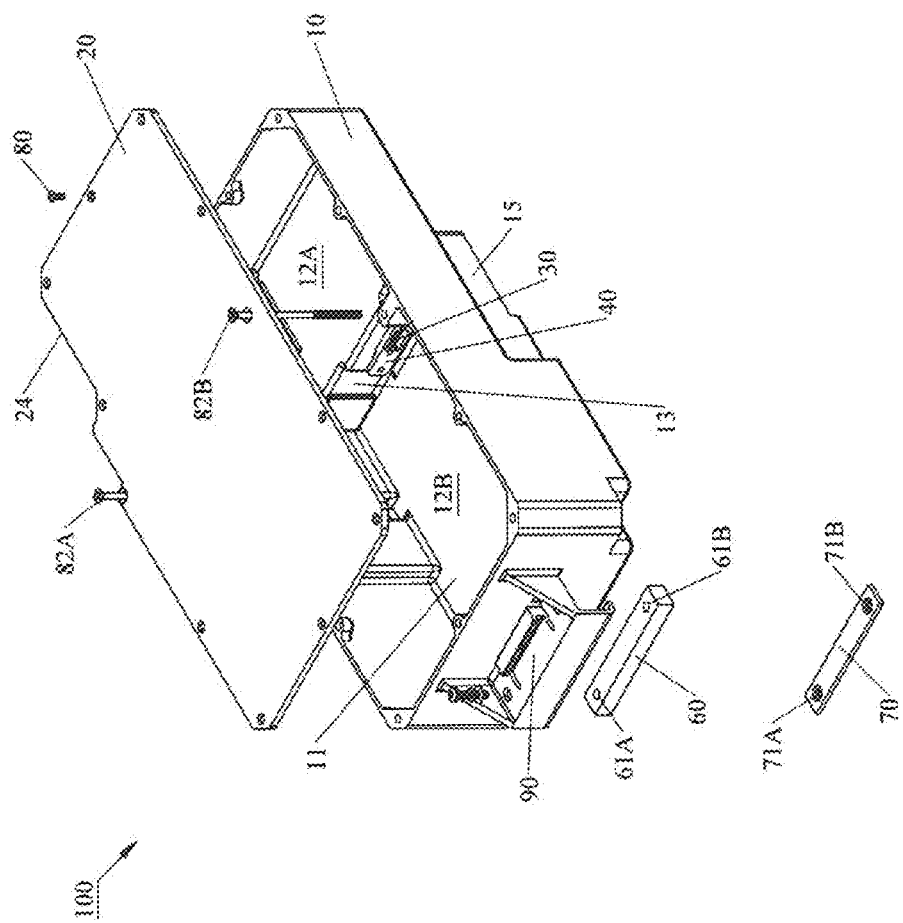

Photographs 8-10 show the payload containment system shown in FIG. 1 installed in an SUGV robotic platform. Photograph 8 shows the payload containment system installed onto a SUGV Model 320 chassis. Photograph 9 shows the payload containment system installed onto a SUGV chassis with the lid removed. Photograph 10 shows the bottom view, form, fit and clearances on a SUGV chassis.

DETAILED DESCRIPTION OF THE INVENTION

Embodiments of present invention are directed to removable payload containment systems for a platform, installation methods thereof, and payload integration kits for existing platforms. The payload containment systems provide a quick and simple way to add or change capabilities or functionality of a platform with relative ease, and which can be locked into place with a latch mechanism. Accordingly, the platform can be adapted, as needed, for any variety of applications, missions, functions or tasks, by adding the removable payload containment system to, or exchanging the removable payload containment system with the platform.

FIG. 1 illustrates a payload containment system 100 according to an embodiment. As shown, the payload containment system 100 generally includes a housing 10, lid 20, connector 30, connector bracket 40, gaskets 50, spacer 60, nut bar 70, fasteners 80, and a latch mechanism 90. In some embodiments, fewer or additional elements may be provided than are necessarily illustrated.

The platform 500 (first depicted in FIGS. 3-4) may be any hardware or components platform—whether an existing platform or specially configured platform, according to embodiments of the present invention. Exemplary platforms may include a rack, chassis, frame, platform, or the like. Such platforms may be part of robotic systems, desktop and laptop computers, tablet computing devices, electronic devices (such as power supplies, amplifiers, diagnostic hardware, radio frequency (RF) equipment and audio/video (A/V) equipment, etc.), avionics, machinery, manufacturing or assembly apparatus, vehicles (e.g., automobiles, trucks, aircrafts, boats, military vehicles, etc.), for instance.

The platform 500 may include an open bay area 510 or other recessed area defined by sidewalls 515. Here, sidewalls 515 include parallel, vertical sidewalls 515A, 515B on the left and right sides of the platform, respectively. A front region 520 of the platform 500, forward of the open bay area 510, may house or otherwise support various electronics. These areas are typically used for stowing hardware (such as a manipulator arm or camera boom, in the case of a robot) when not deployed for use. The open bay area 510 may be largely defined by the design and configuration of the rack, chassis, frame, platform, or the like, of the hardware platform, for instance. According to various embodiments, the payload container system 100 may be configured to substantially conform to the form, fit and clearances of the open bay area 510 or other recessed area of the platform 500. More particularly, at least one of the height, length, and width dimensions of the housing 10 can be sized to substantially correspond to the height, length, or width dimensions, respectively of the platform 500. Thus, the space or volume of the housing 10 can be maximized or optimized to an open bay area 510 of the platform. The platform 500 may include a bulkhead surface 525 which supports an external connector 530 which the connector 30 is adapted to mate with. Details of the connectors are provided below.

Figure 2:
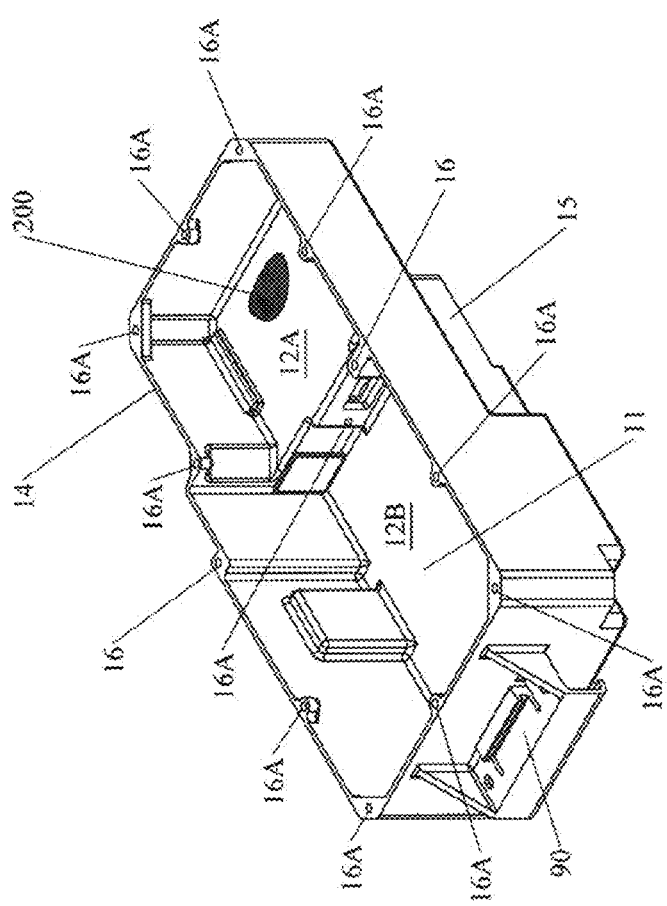
FIG. 2 illustrates the interior of the housing of the payload containment system shown in FIG. 1 in more detail.

For increased rigidly, the platform 500 may include at least one rear cross-bar member 560. Here, the rear cross-bar member 560 spans between the vertical sidewalls 515A, 515B at the rear of the open bay area 510. While the open bay area 510 is illustrated without a bottom surface in some figures, it should be appreciated this configuration is not limiting and that the open bay area 510 could include a bottom surface and/or a top surface, in some instances. As shown in FIG. 2, the housing 10 includes at least one interior volume 11. The interior volume 11 of the payload housing 10 includes bottom surface 12 and (vertical) sidewalls generally defining the interior volume 11. As shown, the interior volume 11 here is generally rectilinear in shape. Although, depending on available volume and configuration of the open bay area 510 of the platform, the housing 10 may have other shapes. The interior volume 11 provides space for one or more components to be housed.

The components may include hardware and/or electronics needed for a particular application or mission. Components configurations, for example, may support sensor platforms, multi-robot and ground/air collaborations, warfare and warfighter efforts, search and rescue missions, hazardous materials situations, explosive ordinance disposal, physical security and surveillance, communications, nuclear, biological, and chemical, among others. Components may include various components needed for any application, mission, function or task, as well as related electronics (e.g., controllers, power supplies, amplifiers, filters, switches, processors, memory device, etc.). For example, typical components may include one or more of: cameras (e.g., two cameras may be provided for stereoscopic vision), thermal (IR) imaging devices, microphones, chemical vapor detectors, Geiger counters, lasers, seismic sensing devices, metal detectors, bomb, mine and improvised explosive device (IED) detectors, weather device (e.g., thermometers, barometers, wind velocity measuring devices, etc.), photovoltaic (solar) array, one or more antennas for radio frequency (RF) communications, a satellite dish for uplink and downlink communications, armaments (e.g., weapons, guns, explosives, etc.), and appendages (e.g., articulated arms for grasping, lifting, probing, etc.), for instance.

In some embodiments, for tactical robotic platform 500, the components provided with a payload containment system 100 may include, but are not limited to: at least one processor (e.g., a multi-core or quad core processor), a hard-disk drive or other memory device, network switch (router), one or more batteries or battery packs, power board, laser-range finder with a pan/tilt unit, global positioning system (GPS), miniature GPS-aided inertial navigation system (IMU), and/or a motion-sensing input device.

The components may be provided with the payload containment system, in some embodiments, but need not be, and may be added or changed later, in other embodiments. Alternatively or additionally, the housing can also be modified to receive "feed-thru" connectors, cables and wires and mount external components. Also, one or more other bulkheads might be provided in the housing or lid for this purpose.

System interfaces for these components may use proprietary and open-source software in some implementations. For example, many hardware components, such as sensors, may require image processors or other controllers for processing input and rendering suitable outputs.

Components may be mounted on a printed circuit board (PCB), for example; but PCBs might not always be needed, and some components can be directly mounted to the housing, whether internally or externally mounted. The components or PCBs may be mounted by suitable fasteners (e.g., screws or bolts) and/or an adhesive. PCBs could be mounted horizontally or vertically depending on available interior space. In addition, the housing 10 may include thermal insulation and/or electrical insulation as may be needed or desired. Potting may be used to provide resistance to shock and vibration, and for exclusion of moisture and corrosive agents. A polyurethane or silicone material may be used for this purpose, for instance.

The housing 10 may further be provided with a power supply, such as including one or more of the following: a battery pack, photovoltaic (solar) cells, fuel cell, transformer, rectifier, inverter, AC/DC converter, DC/DC convertor, power regulating integrated circuit (IC), etc., for example.

In some embodiments, the housing 10 may be fabricated as a unitary construction (i.e., one-piece construction) from a suitable material, such as—aluminum, steel, ABS (Acrylonitrile-Butadiene-Styrene) plastic, ABS-polycarbonate blends, or Acetal polymer (Delrin®), by machining, casting or injection molding, for example. Alternatively, the housing 10 might be formed of multiple walls (i.e., a multi-piece construction) which are welded or otherwise attached together, such as with fasteners or adhesive. The housing 10 may be painted or otherwise colored or patterned for camouflage and/or to match the scheme of the platform 500. The lid 20 may be fabricated from similar material as the housing 10. In one embodiment, the housing 10 and the lid 20 may be formed of a recyclable material to readily permit recycling when the system 100 is damaged or otherwise at the end of its lifecycle.

As shown, the housing 10 has stepped-bottom surfaces 12A, 12B, and a generally-vertical bulkhead surface 13 between the two bottom surfaces 12A and 12B. Here, the housing 10 is shown with a front left-hand corner region 14 which steps inwardly. A relief 15 is also shown on the right, lower side of the housing which corresponds to similar structure of the platform 500. The connector 30 is provided on the bulkhead surface 13 which is adapted to mate with the external connector 530 of the platform 500.

Figure 6:
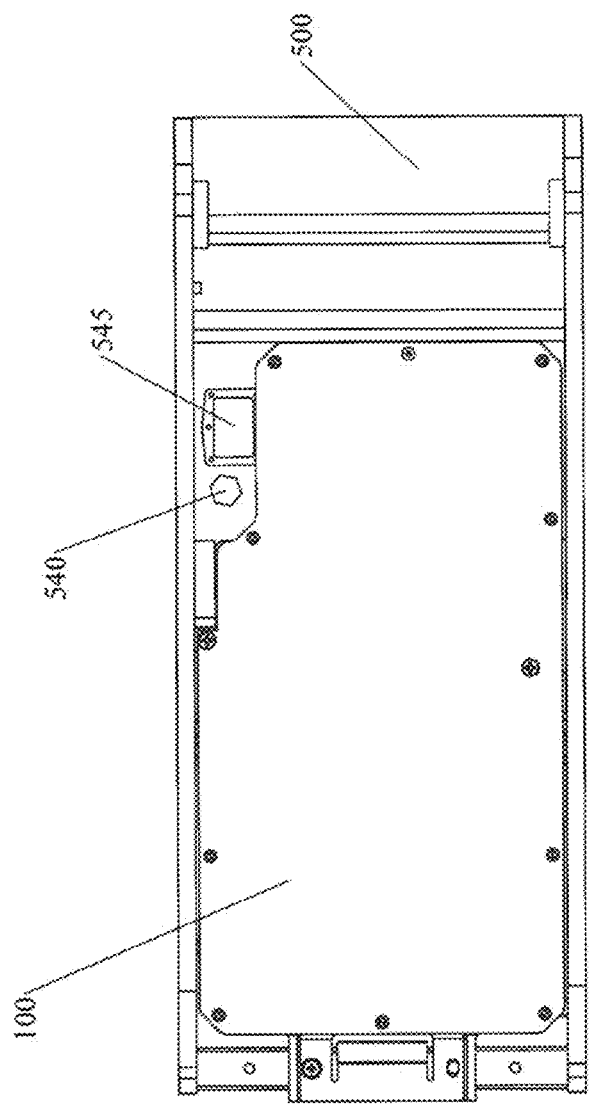
FIG. 6 shows the top view of the payload containment system installed in the platform.

These features generally correspond to profile of the open bay area 510 of the platform. For example, as shown in FIG. 6, the platform may include an on-off power switch 540 (i.e., the hexagonal element) and LCD display screen 545 (i.e., the rectangular element) positioned on the left side of the open bay area. Exterior chamfers, reliefs, recessed portions, projections, etc. may likewise conform to surface features of the open bay area of the platform. The housing 10 is advantageously sized to accommodate these features of the open bay area 510 of the platform 500. Accordingly, the housing 10 thus may slide back and forth without interference with these features within the open bay area 510 of the platform.

The housing 10 may include a removable cover or lid 20 to provide access to the internal space 11 of the housing. In some embodiments, the lid 20 may be connected to the housing 10 with a hinge, but need not be, as shown in the figures. To secure the lid 20 to the housing 10, the lid 20 may be connected to the housing with one or more fasteners or an adhesive. The fasteners 80 may include mechanical fasteners such as a plurality of screws disposed through holes 21 spaced about the perimeter of the lid which couple the lid 20 to the housing 10 and/or the platform 500. Different types of fasteners may be provided at different portions as desired. For instance, longer or larger fasteners 82A, 82B may be provided near the bulkhead 13 for added strength. These extended fasteners 82 not only secure the lid 20 to the housing 10 here, but can also connect to the platform 500. This latter connection may provide more robust coupling of the housing 10 to the platform 500 for more rugged applications. Of course, bolts or other fasteners (such as quick-connect type fasteners having a bayonet connection) might also be used. Corresponding holes 16 in the housing 10 for attaching the lid. These holes may be further provided with threaded inserts molded or otherwise formed therein (e.g., Heli-Coil® inserts) for greater strength. For instance, the threaded inserts may be sized #6-32 for securing the lid to the housing, and sized #4-40 for securing the connector bracket to the housing. Other sized fasteners and/or inserts might also be used.

As shown, the lid 20 is relatively thin and flat and perimeter generally corresponds to the perimeter of the housing. For instance, a front left-hand corner region 24 of the lid 20 may correspond to the profile of the inwardly-stepped left-hand corner region 14 of the housing 10.

This arrangement does not rely on a hinge and permits the lid to be fully removed from the housing 10. An o-ring seal or gasket (e.g., EMI-RFI shielding or environmental seal) may be provided on the interior or undersurface side of the lid 20. But, the lid may have other shapes as may be suitable for various missions. Moreover, in some embodiments, one or both of the housing and the lid may include at least one transparent window or opening to permit light (i.e., UV, visible, or IR) or other electromagnetic radiation (i.e., RF waves, gamma rays, etc.) and/or other phenomena (i.e., acoustic waves, heat, etc.) to enter the interior 11 of the housing, in some implementations.

The housing 10 and the lid 20 together may provide an environmentally-sealed container which can prevent water, dirt, dust, debris, air, moisture, gas, and/or other matter from the entering the internal space thereof and causing damage therein in some embodiments. One or more of the surfaces of the housing, lid or other portions of the system may be coated or provided with shielding materials 200 to prevent electrical or magnetic interference. The shielding materials 200 (e.g., a small exemplary portion shown in FIG. 2) may be applied to some or all of the interior and/or external surfaces thereof.

In some embodiments, the housing 10, the lid 20, or both, might include at least one vent and/or a fan to provide cooling to heat-generating components within the housing. Similarly, one or more heats sink may be mounted to the housing or the lid to readily dissipate heat from various heat-generating components in some embodiments.

The housing 10 may include one or more component holes or thru-holes to permit components inside the housing to interact with the platform. More particularly, the housing 10 may include one or more connectors 30 configured to couple with at least one corresponding interface connector 530 of the platform 500 when the system is engaged with the platform. The connectors 30, 530 may provide electrical, signal, data and/or other resources between the system 100 and the platform 500. Such connectors may include quick-connect or quick-release type couplings generally known in the art which are adapted to couple and uncouple with relative movement there between. When the housing 10 is installed in or on the platform 500, the connectors 30, 530 of the housing and the platform, respectively, engage and mate so as to be in an operable engagement. The connectors may be configured to provide electrical power (e.g., 110 or 220 $V_{AC}$, 5, 12 or 28 $V_{DC}$, etc.), signal and data communications, or both.

Typical electrical connectors include a male connector portion and a female connector portion which "mate" thus providing an operable interface. The male connector portion may be mounted to one of the housing 10 and platform 500, while the female connector portion may be mounted to the other of the housing 10 and platform 500. Additional connectors may be similarly, mounted to the housing and platform.

Depending on the connector type, a separate connector bracket 40 provided on the housing 10 may (or may not) be needed. As shown, the connector 30 is supported by the connector bracket 40 which is mounted to an internal surface of the housing 10. The connector bracket 40 preferably keeps the connector 30 in a substantially firm, rigid attachment with the housing 10 to prevent relative motion there between. Similarly, the corresponding connector 530 on the platform may be firmly and rigidly attached to the platform 500 also (with or without a similar connector bracket). In some embodiments, the connector may be a 21-pin micro-D pre-wired pigtail connector (e.g., available from Glenair Inc.; part number: MWDM2L-21S-4K7-18S) which mates with or plugs into the connector bracket 40.

Other connectors may include standard 2- and 3-prong household U.S. and foreign electrical plugs, 5 $V_{DC}$, 12 $V_{AC}$ or 28 $V_{AC}$ connectors for power, and D-subminiature, DisplayPort, Universal Serial Bus (USB), Digital Visual Interface (DVI), RCA, High-Definition Multimedia Interface (HDMI), S-video, IEEE 1394 ("FireWire"), serial and parallel computer ports for signals, for example. Telephone and network (e.g., Ethernet or RJ-45) connectors and jacks may be provided for network and others communications. This list of connector types, though, is not exhaustive. Some connectors may require adaptors or conversion, such as configuring DIP switches or providing shunts.

Figure 4:
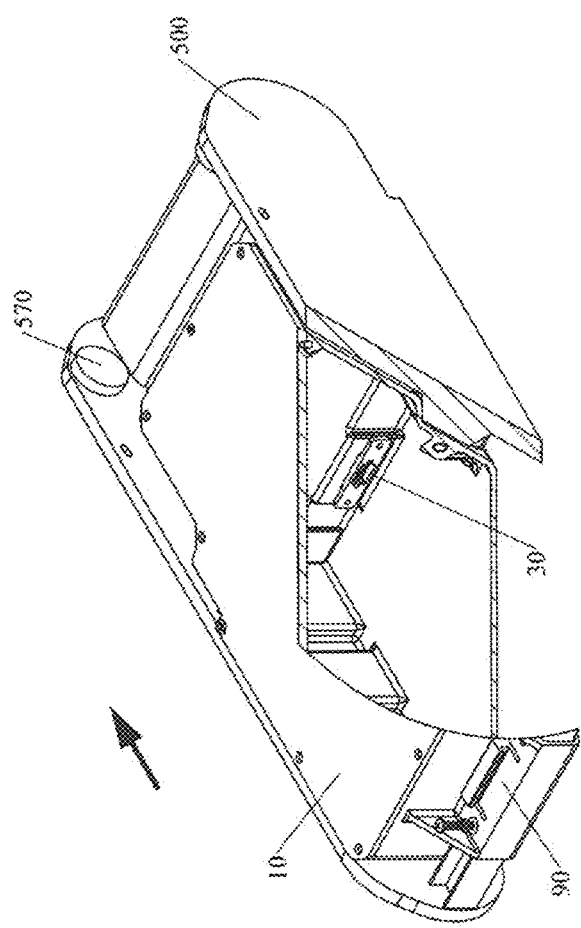

Various original equipment manufacturer (OEM) supplied robot appendages may removably connect to a proprietary electro-mechanical coupler provided on the robot. For example, certain robotic manipulator arms can couple to the robot using a 'plug-in-and-twist' coupler 570, such as found on iRobot Corporation's SUGV. One such coupler 570 is shown in FIG. 4. A proprietary coupler design like this, however, may not readily lend itself to adaptation, and even if it might, it may only permit limited functionality or could be susceptible to damage by conventional coupling by twisting. That is not to say that such a coupling cannot be used in accordance with embodiments of the invention. On the other hand, various connectors may be advantageously be used for a variety of purposes according to aspects of the invention, without the aforementioned limitations.

Alternately or additionally, connectors providing other resources (e.g., air, water, pressurized air, vacuum, hydraulic or pneumatic fluids, chemicals or other substances) may be provided, as available or desired, according to aspects of the invention. Suitable quick-release or quick-connect valves or coupling may be provided as connectors, for example.

Power, signals, data, and/or other resources may be transmitted to, from, and/or between the system 100 and platform 500. In some embodiments, the platform may provide power to the system, while in other embodiments the system may provide power to the platform. While the housing connector 30 in the figures is shown positioned at the bulkhead 13 between the stepped-portions 12A, 12B of the bottom surface, it will be appreciated that the location of the housing connector may be different than illustrated, for example, depending on the existing locations of platform interfaces.

One or more gaskets may be positioned between the system and the platform proximate to the connectors 30 for environmental sealing or shielding. The gaskets may be o-rings in some embodiments. For example, electromagnetic interference-radio frequency interference (EMI-RFI) shielding material may be positioned proximate to the connector 30.

Figure 5A:
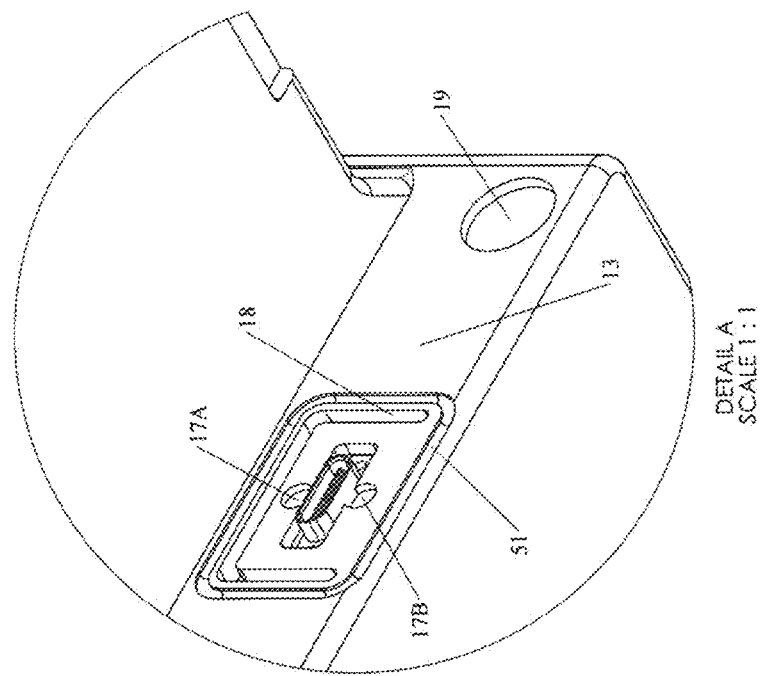

As further illustrated in FIG. 5A, a groove or slot 51 provided on the exterior surface of the bulkhead 13, opposite to the connector bracket 40 for accommodating a gasket, such as an EMI-RFI o-ring. Other environmental sealing, such as gaskets, o-rings, or other sealing mechanisms, might also be used to provide an air, vapor or liquid seal there between. Silicone gaskets may be used for sealing for instance, although grease seals might also be used. When the payload containment system is installed in or on the platform, the gaskets and o-rings may be compressed to form an operable seal or barrier there between.

One important aspect of the payload containment system 100 is the latch mechanism 90. FIG. 5B shows the latch mechanism 90 in more detail. The latch mechanism 90 provides a quick, effective and simple way to install and remove the removable payload containment system 100 to or from the platform 500. The latch mechanism 90 generally includes a body portion 91, a latch 92 and a lip 93.

The body portion 91 of the latch 92 is generally rigid and includes a top (horizontal) surface 91A and a rear (vertical) surface 91B on the obverse of the body portion 91. Gusset plates 94 may optionally connect the body portion of the housing and provide greater rigidity. Left and right gusset plated 94A, 94B are illustrated in FIG. 6B. As shown, the top surface 91A and the rear surface 91B of the body portion 91 as well as the lip 93 are generally orthogonal, but could be configured to engage other different platform structure in other embodiments. This might include rails, sidewalls, other cross-bars, mounting structure, or the like.

The body portion 91 and lip 93 of the latch mechanism 90 may be configured to generally wrap-around or at least partially envelop the cross-bar member 560 while the latch is configured to "lock" or maintains the elements in this position in a fast or non-moving manner. In that regard, the latch 92 is configured to maintain the system 100 in a substantially non-moving engagement with the platform 500 when the latch is engaged, and to permit removal of the system from the platform when the latch is released. The latch 92, in the embodiment shown, is configured to couple to the cross-bar member 560 of the platform, so as to lock the latch mechanism into place.

The latch 92 may depend forwardly from the top surface 91A of the body portion of the latch for contacting the top surface or front upper corner of the rear cross-bar member in the embodiment as shown. Although, it should be appreciated that the latch 92 might by located at other locations in other embodiments, e.g., depending from the lip for contacting the lower surface or front lower corner of the rear cross-bar member. Other latch configurations are also possible based on the platform structure which the latch is configured to contact and engage.

In some embodiments, the latch 92 may include a hinged structure which can pivot or flex with respect to the body portion 91. As shown, the latch 92 may integrally connected to the body portion and be made sufficiently flexible or resilient to permit the hinging function. Cut-out areas 95 in the top surface of the body portion define the width of the latch and permit its flexure with respect to the top surface of the body portion. In other embodiments, reliefs or flexible or expandable webbing material might be used as an alternative or in addition to cut-out area.

A separate hinge element and at least one biasing spring element may be provided as the latch 92 to urge the latch 92 downward when the hinge pivots upward. Spring elements may include a compression, torsion and/or leaf spring, for example. Or, in other embodiments, a spring-biased pin or detent structure connected to tab could also be used for latch to urge the latch downward when the pin or detent is displaced in the opposite direction. For instance, the pin or detent may be biased with a compression spring, torsion and leaf spring. Other latch structure may also be provided in further embodiments.

The spacer 60 and the nut bar 70 are provided to adapt an existing platform 500 for receiving the payload containment system 100. For example, as further shown in FIG. 3 (and in more detail in FIG. 5B: Detail D), the existing platform 510 may include a rear cross-bar member 560 having an "I-beam" or "H-beam" configuration. The spacer 60 and nut bar 70 can be mounted to the cross-bar member 560 to provide smooth and flush top and bottom surfaces via fasteners, such as screws and washers. Adhesives might also be used in addition or as an alternative.

Both the spacer 60 and the nut bar 70 may be provided with respective thru-holes 61 (61A, 61B), 71 (71A, 71B) to accommodate fasteners 96. Thru-holes 97A and 97B may be formed on the top (horizontal) surface 91A of the body 91 of the latch 92 for receiving the additional fasteners 96. And corresponding thru-holes may need to be drilled though or otherwise formed in the cross-bar member 560 (if not already present) to permit passage of the fasteners 96. In some instance, a nut may be provided opposite the head of the fasteners 96. Or the thru-holes 61 in the spacer 60, and/or the thru-holes 71 in the nut bar 70 could be provided with internal threading or include press-fit inserts with threading. Additionally, the spacer 60 and the nut bar 70 may improve the rigidity of the cross-bar member 560 in some instances.

The latch mechanism 90 can slide on the top surfaces of the spacer 60 and nut bar 70 with relative ease. In some embodiments, the spacer 60 and nut bar 70 may be coated with a low-friction of bearing material. As shown, the latch mechanism 90 depends from the rear external surface of the housing 10. In some embodiments, the latch mechanism 90 may be integrally formed with the housing 10. This enables the housing 10 and latch mechanism 90 to be formed together in a single or relatively few molding processes, for instance.

At the distal end of the latch 92 may be a depending tab 98 or tooth to provide an engaging locking structure. The tab 98 or tooth of the latch might engage or otherwise "catch" a portion of the platform, for instance. In the embodiment shown, the tab 98 is a downward-depending tab which extends below the bottom of the top (horizontal) surface 91A of the body portion. When installing the payload containment system to the platform, the tab 98 initially contacts the rear cross-bar of the platform 560 or the spacer's 60 top surface (if used, as discussed below), the tab 98 is urged upwardly slightly causing the latch to pivot or flex back from its original position. As the payload containment system is being installed in or on the platform 500, the tab 98 will be maintained in this position while sliding across the top surface of the rear cross-bar member 560 or spacer 60 until the tab 98 clears the front surface of the cross-bar member 560. At this instance, the tab 98 moves downward due to the latch's own resiliency. The latch 92 may "snap" or otherwise flex or pivot downward thus putting the latch in locking engagement with the rear cross-bar member in this example.

The lip 93 depends forwardly from the lower end of the rear (vertical) surface 91B of the body portion 91. The lip 93 and the top (horizontal) surface 91A are sufficiently spaced apart so as to accommodate the cross-bar member 560 of the platform in a generally conforming manner. In this way, these surfaces maintain the payload containment system in generally one (e.g., horizontal) orientation, and further limit movement of the system with respect to platform to substantially only one direction when at least one connector couples and uncouples with the corresponding at least one interface connector of the platform. Yaw and roll motion of the payload containment system 100 with respect to the platform 500 may be largely be prevented, for example, if the width of the housing and/or overall exterior shape of the housing are substantially the same as that of the open bay area of the platform. Although, in some embodiments, the body portion 91 of the latch mechanism may be further provided with sidewalls or other structure to prevent such motion.

The latch mechanism 90 ensures the system can mate and conversely disengage with the platform connectors in substantially only one direction, e.g., the horizontal direction. As such, vertical, pivotal (pitch), and/or rotational movement of the system with respect to the platform is prevented, when the connectors are being coupled or uncoupled and even while coupled during normal operations, which could damage the connectors.

The length of the lip 93 may be judiciously sized so that connector 30 of the payload containment system will couple and uncouple with (or otherwise mate with) the corresponding connector 530 of the platform while maintaining the system maintaining in substantially one orientation with respect to the platform. Here, as shown, that orientation may be the generally horizontal orientation—with motion being limited in the forward and backward directions only. Thus, the system 10 cannot be rotated, and/or pivoted in a manner which could cause damage to the connectors. Indeed, the connectors 30, 530 may be easily damaged, if the orientation of the connectors 30, 530 is not properly maintained when coupling or uncoupling or even when mated during normal operations.

A handle 99 may be provided on the latch 92 opposite to the tab 98. For example, the handle 99 may be configured as a lever which can be manually grasped and/or with a pry tool, such as a blade or slotted screwdriver or crow bar, to urge the tab upward to enable the tab to clear the rear cross-bar member and thus permit removal of the system from the platform. In one embodiment, the handle 99 may have an ergonomic design which may be grasped by a person's fingers to manipulate the handle 99, and could be appropriately sized to accommodate the person wearing gloves which could be beneficial for soldiers or other persons in the field.

When removing the payload containment system from the platform, the latch 92 is disengaged or released. This may include raising the handle 99 so that the latch 92 can clear the rear-cross member 560. In that way, the payload containment system 100 can be moved (horizontally) toward the rear of the platform 500, i.e. far enough that the lip is unobstructed by the rear cross-bar member. The connector 30 will uncouple before the lip 93 has thus cleared the rear cross-bar member 560, advantageously then allowing the system 100 to be raised and removed from the open bay area 510 of the platform without damaging the connectors 30, 530.

FIG. 2 illustrates the interior 11 of the housing of the payload containment system shown in FIG. 1 in more detail. As shown, one or more interior surface of the housing are treated or provided with an electromagnetic interference-radio frequency interference (EMI-RFI) shielding material 200. In one embodiment, a nickel coating or other suitable material may be used for this purpose. Similarly, one or more interior surfaces of the lid 20 or other portions of the containment system may be treated or provided with EMI-RFI shielding material 200. In addition, one or more o-rings or gaskets may be provided to shield components in the housing from the environment. The o-rings/gaskets may provide EMI-RFI shielding to protect electrical circuits that may be installed into the housing as well in some embodiments.

Portions of interior walls of the housing 10 may be made thicker than others or further provided with reliefs, chamfers, projections, or gusset plates, to increase the rigidity of the housing, if necessary.

FIGS. 3-6 illustrate the payload containment system shown in FIG. 1 in combination with a platform according to aspects of the invention. The payload containment system adds capabilities onto an existing platform.

Here, the platform 500 may be a Small Unmanned Ground Vehicle, such as the Small Unmanned Ground Vehicle (SUGV) models Nos. 310 and 320 available from iRobot Corporation of Somerville, Mass., for example. SUGV robotic platforms are typically used for gathering situational awareness by relaying video from onboard image sensors, with the SUGV being remotely or tele-operated.

Figure 3:
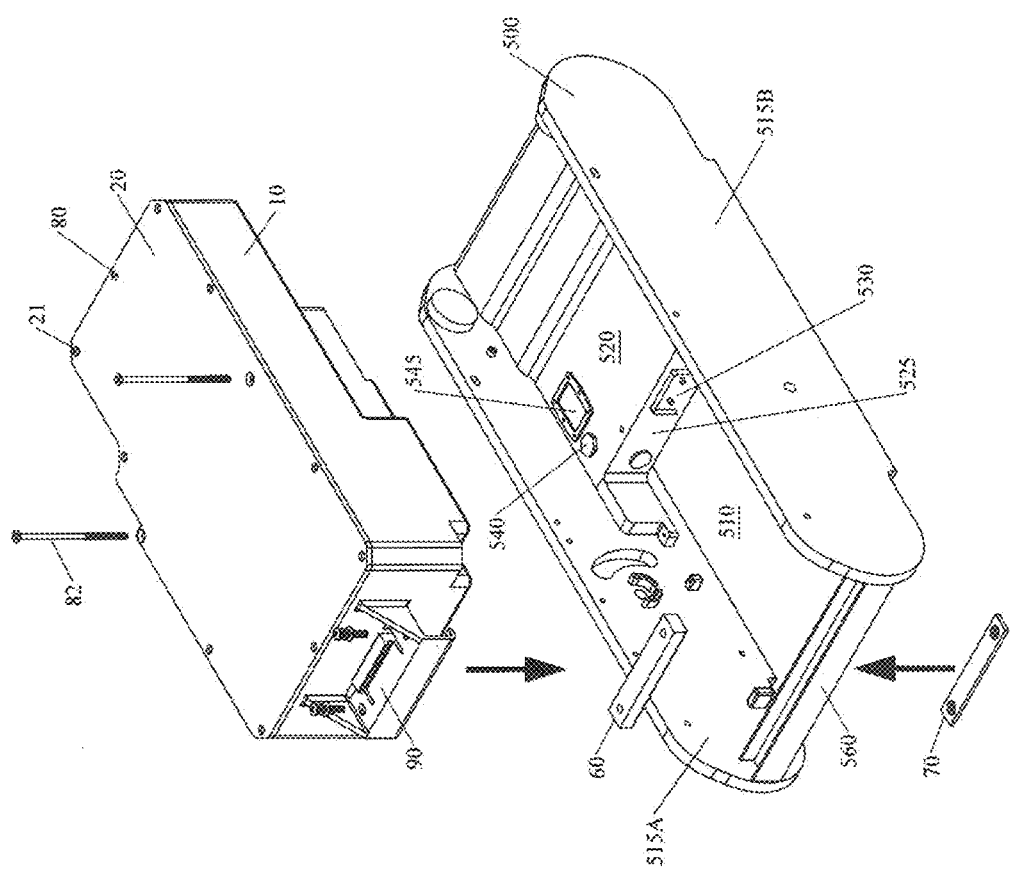
FIGS. 3-4 show a method for installing the payload containment system onto an existing Small Unmanned Ground Vehicle (SUGV) robotic platform.

FIGS. 3-4 show a method for installing the payload containment system onto an existing Small Unmanned Ground Vehicle (SUGV) robotic platform. The payload containment system may be installed onto the SUGV in two steps, for example. First, as illustrated in FIG. 3, the payload containment system 100 is lowered downward (vertically) into the open bay area 510 of the SGUV platform 500. The front bottom surface 12A of the housing 10 may contact or otherwise engage the front region 520 of the platform 500.

Then, as illustrated in FIG. 4, the payload containment system 100 is moved (horizontally) toward the front of the SUGV 500 until the latch 92 engages (i.e., snaps) over the SUGV rear cross member 560, making the signal and power connection as well as securing the system into place. For instance, the front bottom surface 12A of the housing 10 may slide along the front region 520 of the platform 500 until the latch 92 fully engages the cross member 560. One or more additional mechanical fasteners (e.g., screws or bolts), may be further used when operating in a more rugged terrain. The lid 20 may be installed on the housing 10 before or after installation, although, it would be preferred to do so well-before installation in the field to prevent contaminants from entering the interior 11 of the housing 10.

Figure 5A:
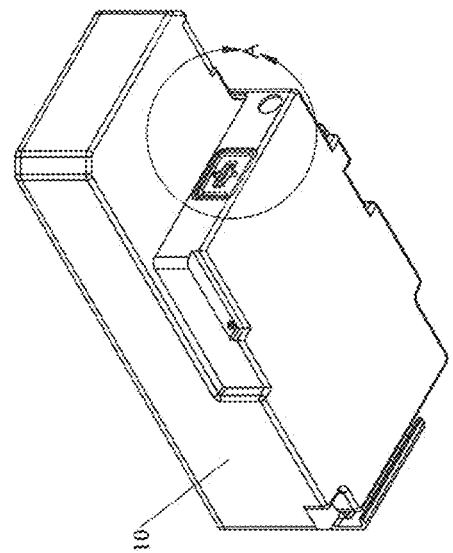
Figure 8:
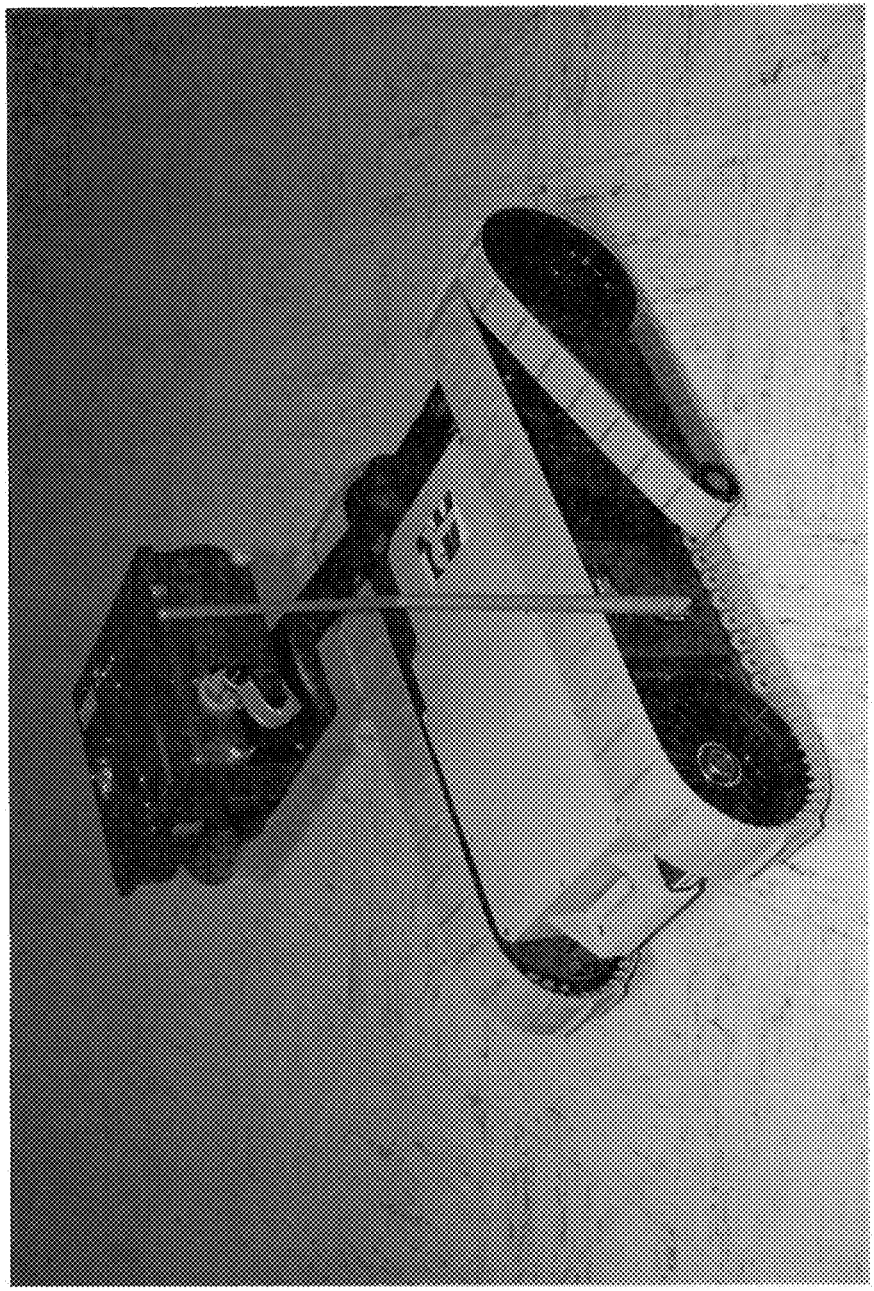
Figure 9:
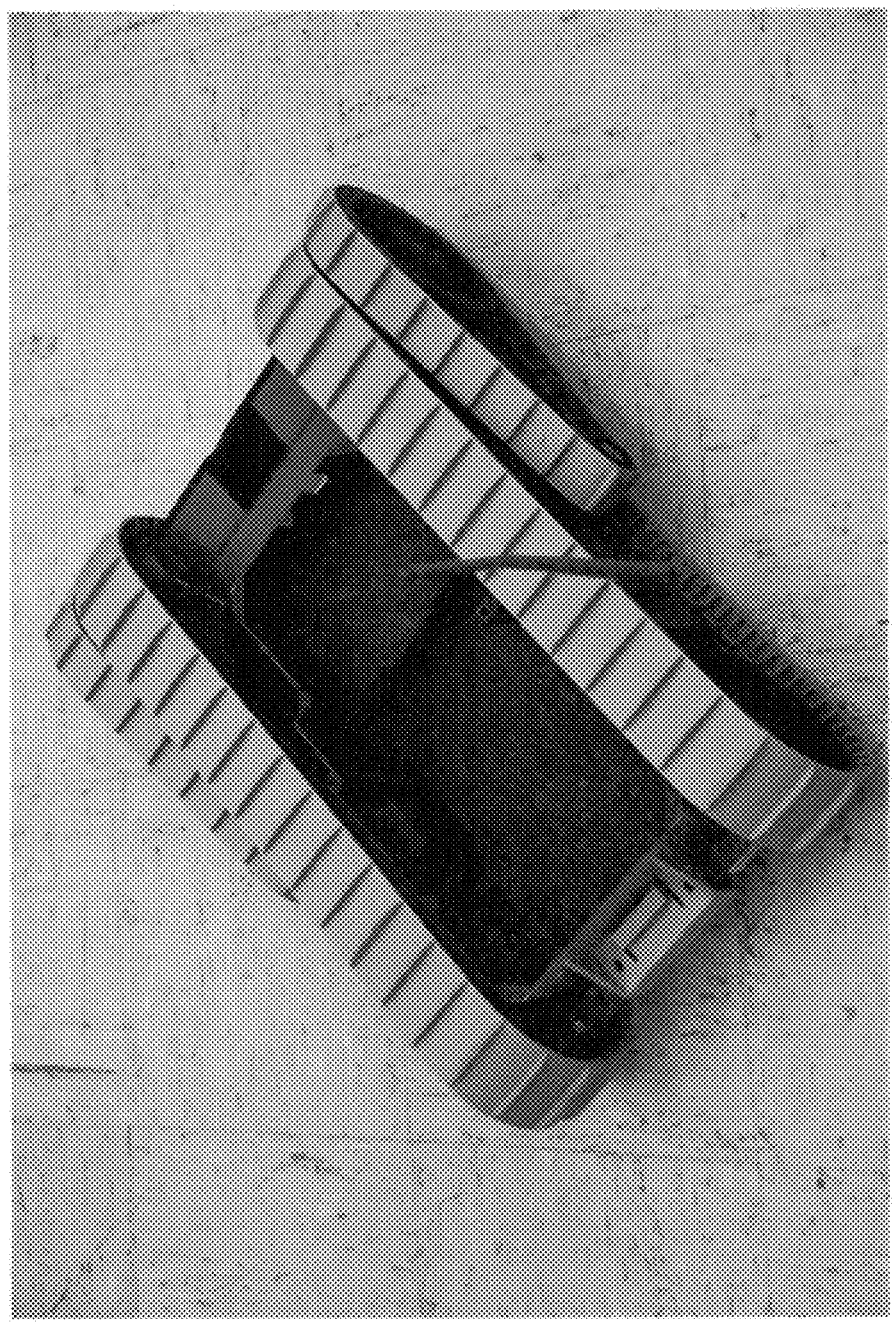
Figure 10:
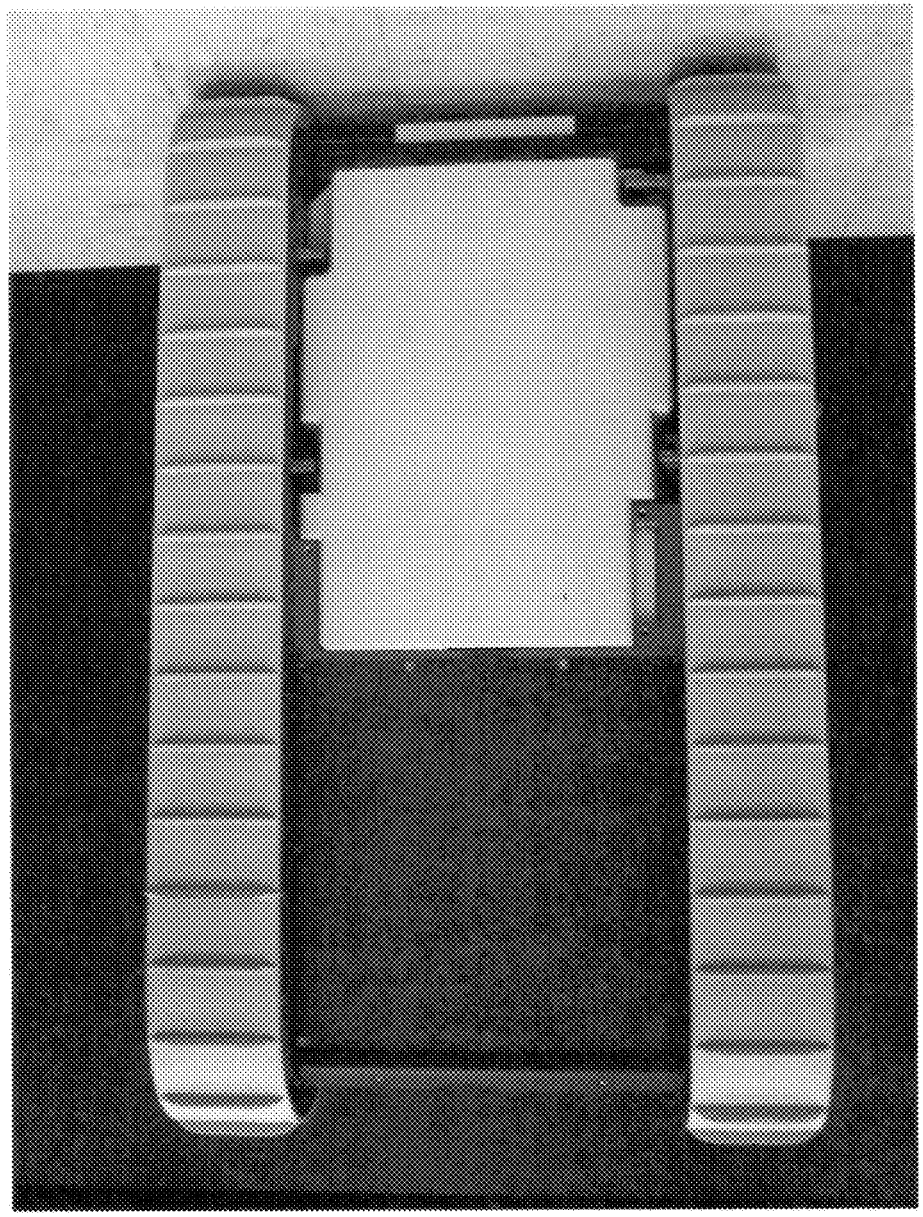

FIGS. 5-6 illustrates various view of the payload containment system installed in an open bay area of the SGUV platform. In these figures, the manipulator and camera of the SUGV Model 310, and the head/neck assembly of the SGUV Model 320 have been removed for clarity. Also, the tracks and flippers of these robots have been not shown for clarity. The elements are shown in photographs of FIGS. 8-10 though.

FIGS. 5, 5A and 5B show the payload containment system, latch mechanism and connector interface in greater detail. FIG. 5 shows a cross-sectional view of the payload containment system 100 installed in the platform 500 taken along line A-A. The o-ring gasket 50 is shown compressed between the payload containment system 100 and the platform 500 in the vicinity of the connector interface.

FIG. 5A illustrates the front exterior surface of the housing at the connector interface. Detail A shows, in more detail, a portion of the bulkhead 13 of the housing 10 in the vicinity of the connector interface. The bulkhead 13 of the housing 10 includes a connector 30 opening or thru-hole which enables the housing's connector couples with an interface connector 530 of the platform. In this embodiment, the connector interface is located at the vertical step at the bottom surfaces 12A, 12B of the housing 10.

The two-small circular indents 17A, 17B and "C-shaped" indent 18 in the vicinity of the connector opening correspond to projections or reliefs provided on the platform 510, as shown in FIG. 3. The larger circular 19 indent in the corner corresponds to another relief element of the platform. The indents and projections or reliefs might also be reversed in some instances. When the payload containment system is installed in or on the platform, the projections or reliefs on the platform can engage (e.g., the projections or reliefs slide into the indents) when the payload containment system is installed in or on the platform.

These complementary elements, if provided, may help better align the connectors before and during coupling/uncoupling, and further hold the payload containment system in place and prevent rotation and/or pivoting movement of the payload containment system with respect to the platform thus preventing damage to the connector. The complementary indents, projections or reliefs may be existing structure of the platform, for example, corresponding to a flange or other existing feature or specifically added to the platform structure for these purposes. It will be appreciated that the locations of the indents and projection or reliefs may vary from what is illustrated. The generally circular groove encircling the connector opening is configured to receive an EMI-RFI or other environmental seal.

FIG. 5B illustrates the rear exterior surface of the housing showing the latch mechanism 90. The latch mechanism 90 advantageously has multiple functions. First, it provides the forward pressure to keep the 21-pin interface connectors 30, 530 between the payload containment system and the SUGV engaged. In some instances, addition spring element(s) might also be provided, which when depressed between the system and the platform, further generate the forward pressure. Additionally, the forward force/pressure helps to compress the EMI-RFI and environmental seals at the connector end of the payload containment system to form an operable seal there between. Detail C shows, in more detail, the cross-section of the latch mechanism of the system illustrated in FIG. 5. Detail D shows an isometric view in more detail of the external structure of the latch mechanism illustrated in FIG. 5A.

Secondly, the wrap-around body portion on the top 91A and rear surface 91B of the latch mechanism 90 and the lip 93 on the bottom of the latch mechanism 90 prevent damage to the interface connectors 30, 530 when being coupled and uncoupled, and even during normal operations. When removing the payload containment system 100 from the SUGV platform 500, the latch 92 may be disengaged and raised to "clear" the SUGV rear cross-bar member 560. The payload containment system can be moved (horizontally) toward the rear of the SUGV far enough that the lip 93 is unobstructed by the rear cross-bar member 560 allowing the system to be raised upward (vertically) from the open bay area 510. The 21-pin connectors 30, 530 will uncouple before the lip has sufficient clearance to allow the payload container system to be raised and subsequently removed from the open bay area of the platform, thus preventing damage to the connectors (e.g. bent pins/contacts, cracked wall, etc.).

FIG. 6 shows the top view of the payload containment system installed in the platform. As depicted, the system 100, when installed in the platform 500, is substantially encompassed by the open bay area 510 of the platform 500. The overall "foot-print" of the platform 500 is therefore not increased. Moreover, because the platform 100 is sized for the platform 500, the overall size of the two together is not substantially increased either.

Figure 7:
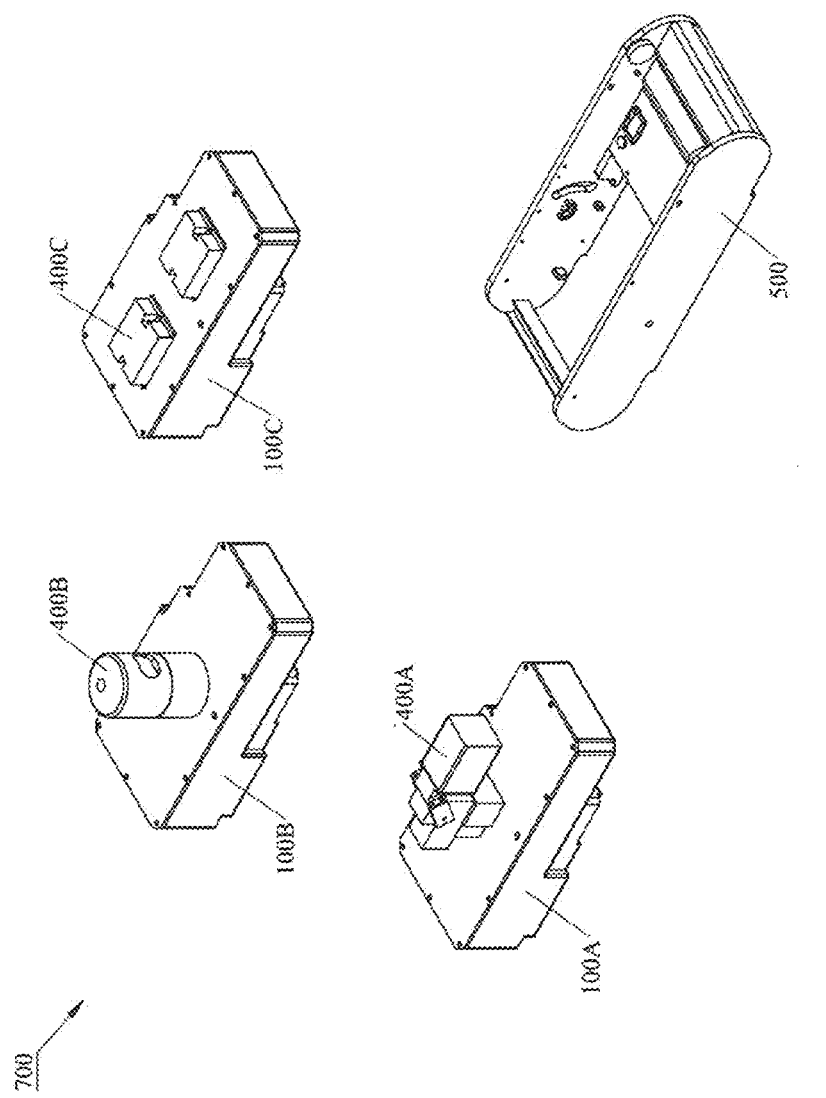
FIG. 7 shows an example of a modular system according to an embodiment.

FIG. 7 shows an example of a modular system 700 according to an embodiment. The modular system 700 includes a plurality of payload containment systems 100 (100A, 100B, 100C) for the same platform 500 may be provided. Here, there are three payload containment systems 100A, 100B, 100C shown with different sensor and/or instrument configurations 400 (400A, 400B, 400C). As illustrated, the first payload containment system 100A includes a pan-and-tilt scanning laser-range finder 400A. The second payload containment system 100B includes a high-definition light detection and ranging (LIDar) sensor 400B. And, the third payload containment system 100B includes externally mounted heat sinks 400C (e.g., two illustrated in the figure) for dissipating heat from integrated circuits (IC). However, the number and configuration of the payload containment systems 100 are not limiting.

In this way, the payload containment systems provide a modular adaptable, packaging mechanism, to accommodate current and changing electro-mechanical technologies for the platform. The releasable latch mechanism of the modules enables for rapid, quick change or replacement of the payload containment systems and functionality of platform.

In some modular systems, according to embodiments, a plurality of payload containment systems may be provided, in which the systems can be installed in the same platform 500 with at least two systems having different component configurations. Electronic and hardware components or system level payloads can be subsequently added or exchanged based upon mission requirements. But multiple platforms 500 might also provided in other embodiments, whether the same type or different.

Various modular configurations for a robotic platform may include, but are not necessarily limited to, the following: (1) an "Accelerated 2-D Mapping and Exploration" configuration for exploring unknown buildings at increased operational tempo and transmitting maps back to soldiers; (2) a "Platform-Constrained 3-D Mapping for Urban Environments" configuration for supporting operations of mobile robots for militarily relevant indoor/outdoor transitions and supplying richer environmental data for autonomous planning and operator visualization; (3) an "Adaptive Navigation for SUGVs in Military Environments" configuration for understanding and mitigating slip conditions to enable robust search-based planning of autonomous tactical behaviors at relevant operational speeds; and (4) a "Multi-Robot Tactical Behaviors" configuration for leveraging the flexibility of heterogeneous robot teams to address problems of persistent surveillance, communications maintenance, and mapping. Future platform demands can also be upgradeable and adaptable to new technology at a later time. Components of the payload containment systems may vary for each of these configurations.

For some modular payload containment systems, one or more dimensions of the housing may be altered. By making the sidewalls of the housing taller, for instance, larger internal components might be accommodated. This may be practical, for instance, in accommodating PCBs in a vertical upright orientation. Or one or more openings or cavities may be provided in the lid or housing to accommodate large or external components.

Photographs 8-10 show an exemplary payload containment system installed in a SUGV according to aspects of the invention.

The payload containment system may be configured to augment the space which is conventionally used on the SUGV Model Nos. 310 and 320 for stowing the manipulator, camera, or head/neck assemblies. The payload containment system maximizes the usable space by conforming to the open bay area of the SUGV. On the SUGV Model No. 310, the manipulator, camera, and carry handle are removed to take advantage of existing interfaces. Whereas on the SUGV Model No. 320, only the carry handle is removed. The head/neck assembly can still be used in that configuration; however, it may no longer be able to be fully stowed when the payload containment system is installed.

According to various embodiments, a payload integration kit may be provided to leverage with the mobility of an existing or commercially-available platform; thus changing or adding capabilities to the existing or commercially-available platform. The payload integration kit may include a payload containment system as well as additional components needed to adapt the existing platform for use with the payload containment system.

For example, as discussed above, the spacer and nut bar (or additional spacer) may be provided as part of the payload integration kit which attach to the rear cross-bar member of a platform in some embodiments. Additional fasteners may also be provided to further attach the payload containment system to the platform. Suitable instructions detailing installation of the payload integration kit might also be provided with the payload integration kit.

Additionally, the payload containment systems described herein may provide a "stand alone" application which can supports testing and trouble shooting, when connected to external power and communications. The systems may allow for more reliable experimentation, critical in the laboratory as well as in field environments.

The relative positional terms (e.g., vertical, horizontal, top, bottom, forward, rear, etc.) used herein are based on the positions of the system illustrated in the drawings. It will be appreciated that these relative positions can change as the position of the system changes, or may be different for other embodiments and orientations. As such, the use of these relative positional terms in the above description should not be strictly construed as limiting in any manner and merely have been used for ease of discussion.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

While the foregoing is directed to embodiments of the present invention, other and further embodiments of the invention may be devised without departing from the basic scope thereof, and the scope thereof is determined by the claims that follow.

The invention claimed is:

1. A removable payload containment system for installation in or on a platform, the system comprising:
   a housing having internal space for one or more components, the housing including at least one connector positioned on a front side of the housing configured to couple with at least one corresponding connector of the platform when the system is installed in or on the platform; and
   a latch mechanism positioned on a rear side of the housing, opposing the front side, that couples to a member of the platform positioned rearward to the at least one corresponding connector on the platform, and which is configured to maintain the system into substantially non-moving engagement with the platform when engaged therewith, and permit removal of the system from the platform when released,
   the latch mechanism comprising a resilient latch having a tab which locks the position of the housing with respect to the platform, with the resilient latch being, in an unbiased position, when the housing is installed in or on the platform, and, in a biased position, when the housing is being installed or removed from the platform,
   wherein the latch mechanism limits movement of the housing with respect to platform in substantially only one direction when the at least one connector couples and uncouples, and is mated, with the corresponding at least one connector of the platform when installing or removing the system from the platform.

2. The system of claim 1, wherein the latch mechanism further comprises:
   a body portion; and
   a lip,
   wherein the body portion and lip are configured to contact the member when the at least one connector couples and uncouples with the at least one corresponding connector of the platform when installing the system in or on the platform or removing the system from the platform, and the resilient latch is configured to lock or maintain the at least one connector, in a coupled position, with the at least one corresponding connector of the platform.

3. The system of claim 2, wherein the body portion comprises first and second surfaces, the first and second surfaces being substantially orthogonal; and the lip comprises a third surface, the first and third surfaces being substantially parallel.

4. The system of claim 2, wherein the resilient latch is connected to the first surface of the body portion of the latch mechanism.

5. The system of claim 1, wherein the resilient latch comprises a resiliently flexible hinge, spring-biased hinge, or a spring-biased pin or detent.

6. The system of claim 2, wherein the length of the lip is sized so that the at least one connector will couple and uncouple with the corresponding at least one connector of the platform while maintaining the system in substantially one orientation.

7. The system of claim 1, wherein the resilient latch comprises a handle configured to release the latch mechanism from engagement.

8. The system of claim 1, further comprising at least one seal or gasket positioned on an external surface of the housing proximate to the connector which becomes substantially operable when the system is installed in or on the platform.

9. The system of claim 8, wherein the latch mechanism generates a forward force or pressure to (i) maintain the at least one connector coupled with the at least one corresponding connector of the platform, (ii) compress the at least one seal or gasket when the latch mechanism couples with the member of the platform, or both.

10. The system of claim 1, further comprising: a lid for covering the housing, the lid and housing providing a sealed internal space for one or more components therein.

11. The system of claim 10, wherein one or more surfaces of the housing, the lid, or both, are provided with an electromagnetic interference-radio frequency interference (EMI-RFI) shielding material.

12. The system of claim 1, wherein the at least one connector on the housing comprises:
   a quick-connect or quick-release type coupling which couples and uncouples with the at least one corresponding connector of the platform with relative movement there between.

13. The system of claim 1, wherein the platform and housing include complementary elements which engage when the payload containment system is installed in or on the platform.

14. The system of claim 1, wherein the housing substantially conforms to the dimensions and/or shape of an open bay area or a recessed area of the platform.

15. A removable payload containment system for installation in or on a platform, the system comprising:
   a housing having internal space for one or more components, the housing including at least one connector configured to couple with at least one corresponding connector of a platform when the system is installed in or on the platform, wherein the platform comprises an iRobot Corporation's Small Unmanned Ground Vehicle (SUGV) Model No. 310 or Model No. 320; and
   a latch mechanism that couples to a member of the platform and is configured to maintain the system into substantially non-moving engagement with the platform when engaged therewith, and permit removal of the system from the platform when released,
   wherein the latch mechanism limits movement of the housing with respect to platform in substantially only one direction when the at least one connector couples and uncouples, and is mated, with the corresponding at least one connector of the platform when installing or removing the system from the platform.

16. The system of claim 1, wherein the member of the platform comprises a cross-bar member of the platform.

17. The system of claim 1, wherein the at least one connector and the corresponding at least one connector of the platform enable power, signals, data, or other resources to be transmitted to, from, and/or between the system and the platform.

18. The system of claim 1, wherein the housing and the latch mechanism are integrally formed.

19. A method of installing or removing the removable payload containment system of claim 1 in or on a platform, the method comprising:
   moving the payload containment system in one direction when the at least one connector couples or uncouples with the corresponding at least one connector of the platform,
   wherein the latch mechanism limits motion to substantially only the one said direction.

20. The method of claim 19, further comprising:
   moving the payload containment system in a second direction to place the system adjacent to or remove the system away from the platform.

21. A payload integration kit for an existing platform comprising:

the removable payload containment system of claim 1; and
one or more components to adapt the existing platform for use with the payload containment system.

22. The kit of claim 21, further comprising: at least one spacer member configured to be attached to the member of the platform and provide a surface which the latch mechanism contacts.

23. A modular payload containment system for installation in or on a platform comprising:
a plurality of payload containment systems of claim 1, wherein the systems are configured to be installed in or on the same platform with at least two systems having different component configurations.

24. A combination comprising:
the removable payload containment system of claim 1; and
the platform.

25. The system of claim 1, wherein the resilient latch is configured to slide against the member of the platform when the housing is being installed in or on the platform so as to cause the latch mechanism to engage and couple to the member.

26. The system of claim 1, wherein, when installing or removing the housing to or from the platform, the tab contacts the member of the platform causes the resilient latch to go from the unbiased position to the biased position.

27. The system of claim 3, wherein the tab extends from the first surface of the body portion of the latch mechanism.

* * * * *